US009963925B2

United States Patent
Schwendemann et al.

(10) Patent No.: US 9,963,925 B2
(45) Date of Patent: May 8, 2018

(54) FASTENING CONCEPT FOR THE PLAY-FREE MOUNTING OF ADJUSTMENT DRIVES IN A MOTOR VEHICLE

(71) Applicant: Robert Bosch GmbH, Stuttgart (DE)

(72) Inventors: Franz Schwendemann, Ottersweier (DE); Hans-Juergen Oberle, Rastatt (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 15/118,262

(22) PCT Filed: Jan. 30, 2015

(86) PCT No.: PCT/EP2015/051969
§ 371 (c)(1),
(2) Date: Aug. 11, 2016

(87) PCT Pub. No.: WO2015/121088
PCT Pub. Date: Aug. 20, 2015

(65) Prior Publication Data
US 2017/0183903 A1     Jun. 29, 2017

(30) Foreign Application Priority Data

Feb. 14, 2014   (DE) .................. 10 2014 202 765

(51) Int. Cl.
*B62D 25/00* (2006.01)
*E05F 15/63* (2015.01)
(Continued)

(52) U.S. Cl.
CPC .......... *E05F 15/63* (2015.01); *B62D 33/0273* (2013.01); *E05D 11/00* (2013.01);
(Continued)

(58) Field of Classification Search
CPC . H01Q 9/14; H01Q 1/34; A63H 29/24; G03D 13/003; Y10T 83/2024;
(Continued)

(56) References Cited

U.S. PATENT DOCUMENTS

| 3,740,970 | A | * | 6/1973 | Christian | .................. | F16D 3/00 |
| | | | | | | 464/177 |
| 4,322,912 | A | * | 4/1982 | Heinrich | ................. | E05F 15/41 |
| | | | | | | 49/28 |

(Continued)

FOREIGN PATENT DOCUMENTS

| CN | 1476508 A | 2/2004 |
| CN | 101495708 A | 7/2009 |

(Continued)

OTHER PUBLICATIONS

International Search Report for Application No. PCT/EP2015/051969 dated Mar. 17, 2015 (English Translation, 2 pages).

*Primary Examiner* — Kiran B Patel
(74) *Attorney, Agent, or Firm* — Michael Best & Friedrich LLP

(57) ABSTRACT

The present invention relates to a drive arrangement having a hinge which comprises a first hinge arm and a second hinge arm which can be rotated with respect to the first hinge arm about a hinge axis, wherein the first hinge arm is arranged by means of a bolt on a support means which is provided to support a torque when the hinge arms are rotated relative to one another, in that the bolt engages through an aperture in the first hinge arm and is fixed by means of an elastic press fit in a through-hole of the support means. The present invention additionally relates to a motor vehicle having such a drive arrangement, to a bolt for such a drive arrangement, and to a method for mounting the drive arrangement.

14 Claims, 4 Drawing Sheets

(51) Int. Cl.
*B62D 33/027* (2006.01)
*E05F 15/614* (2015.01)
*E05D 11/00* (2006.01)

(52) U.S. Cl.
CPC ......... *E05F 15/614* (2015.01); *E05Y 2600/51* (2013.01); *E05Y 2600/62* (2013.01); *E05Y 2900/546* (2013.01)

(58) Field of Classification Search
CPC ...... G07F 19/20; G07F 19/205; E05C 19/001; E05D 7/0027; E05D 7/14
USPC .......................................................... 296/56
See application file for complete search history.

(56) References Cited

U.S. PATENT DOCUMENTS

| | | | | |
|---|---|---|---|---|
| 5,680,792 A * | 10/1997 | Buhl | ............ | B60S 1/24 15/250.31 |
| 6,217,097 B1 * | 4/2001 | Rogers, Jr. | ............ | B60P 1/26 296/106 |
| 6,226,805 B1 * | 5/2001 | Watkins | ............ | A47K 13/24 4/253 |
| 7,240,400 B2 * | 7/2007 | Bonham | ............ | E05D 5/06 16/238 |
| 7,540,554 B2 * | 6/2009 | Bals | ............ | E05F 15/614 296/146.11 |
| 9,822,574 B2 * | 11/2017 | Heiberger | ............ | E05F 15/614 |
| 9,834,974 B2 * | 12/2017 | Elie | ............ | E05F 15/614 |
| 2008/0196524 A1 * | 8/2008 | Oberle | ............ | B60N 2/0224 74/89.34 |
| 2010/0072806 A1 * | 3/2010 | Lauffer | ............ | B60B 7/0013 301/37.373 |
| 2014/0150208 A1 * | 6/2014 | Haab | ............ | E05D 7/0423 16/86.2 |
| 2014/0373454 A1 * | 12/2014 | Sasaki | ............ | E05F 15/63 49/350 |
| 2016/0059907 A1 * | 3/2016 | Braun | ............ | H02K 15/00 310/75 R |

FOREIGN PATENT DOCUMENTS

| | | |
|---|---|---|
| CN | 102330734 A | 1/2012 |
| DE | 3404152 A1 | 8/1985 |
| DE | 10302553 | 2/2004 |
| DE | 102009029601 | 3/2010 |
| DE | 102011078518 | 1/2013 |
| DE | 102013226331 | 7/2015 |
| WO | 2013004484 | 1/2013 |

* cited by examiner

FASTENING CONCEPT FOR THE PLAY-FREE MOUNTING OF ADJUSTMENT DRIVES IN A MOTOR VEHICLE

BACKGROUND OF THE INVENTION

The present invention relates to a drive arrangement with a hinge which comprises a first hinge arm and a second hinge arm which is rotatable with respect to the first hinge arm about a hinge axis, wherein the first hinge arm is arranged on a support means by means of a bolt, wherein the bolt reaches through a through-hole in the first hinge arm. The present invention also relates to a motor vehicle with such a drive arrangement and to a method for the mounting of the drive arrangement.

Such drive arrangements are known for adjusting components, in particular flaps, for example for pivoting the tailgate of a motor vehicle. Flaps having a great weight and large dimensions can therefore be adjusted with said drive arrangements. The component is arranged here on the second hinge arm. A torque occurring when the second hinge arm is rotated relative to the first hinge arm is supported by the bolt and the supporting means.

In order to avoid switch-over noises during the starting of the rotational movement, during the stopping of the rotational movement and/or in the event of a change in direction, the component has to be arranged on the adjustment drive in a permanently play-free manner. This is indeed frequently ensured in the new state. However, because of the weight and the considerable dimensions of the components to be adjusted and because of the changing load direction on opening and closing the component, wear and settling processes occur over the service life of the arrangement, in particular at the bolt, and therefore the component is no longer fastened in a play-free manner.

The document DE 10 2013 226 331.7 therefore discloses a drive arrangement in which the bolt is of conical design, and therefore the bolt tapers in a first direction of extent toward the first hinge arm. In addition, the drive arrangement comprises a force means which pulls or pushes the support means in the first direction of extent toward the first hinge arm, or pulls or pushes the first hinge arm counter to the first direction of extent toward the support means. As a result, the bolt is pulled or pushed with the force of the force means into the through-hole, and therefore the bolt lies in the latter in a play-free manner. A play arising over the service life is therefore always immediately compensated for with the force means.

SUMMARY OF THE INVENTION

It is the object of the present invention to provide an alternative drive arrangement for adjusting a component, in particular a tailgate of a motor vehicle, in which the component is mounted in a play-free manner not only in the new state, but as far as possible over the entire service life of the drive arrangement, and which can be produced cost-effectively and can be mounted in a simple manner.

The object is achieved with a drive arrangement with a hinge which comprises a first hinge arm and a second hinge arm which is rotatable with respect to the first hinge arm about a hinge axis, wherein the first hinge arm is arranged on a support means by means of a bolt, wherein the bolt reaches through a recess in the first hinge arm.

The drive arrangement is distinguished in that the bolt is secured by means of an elastic press fit in a through-hole of the support means.

Since the press fit has elasticity, the bolt lies in the through-hole in a play-free manner not only at the mounting time, but also even after settling processes. A play arising over the service life is therefore always immediately compensated for by the elasticity of the press fit.

For this purpose, it is preferred for the through-hole to be designed as an elongated hole. As a result, it has elasticity in a Y direction transverse to the direction of extent of the elongated hole. In order to adapt the elasticity in the Y direction in a manner specific to the use, it is also preferred for notches to be provided on the through-hole. A notch preferably extends in or counter to the direction of extent of the through-hole, or one notch extends in the direction of extent and a further notch extends on the opposite side counter to the direction of extent.

In addition, for this purpose it is preferred for the bolt to have a cylindrical region which is arranged in the through-hole. The cylindrical region preferably has a diameter which is larger than a height of the through-hole, in particular in the Y direction transverse to the direction of extent of the through-hole. During the fitting of the cylindrical region into the through-hole, the latter is therefore extended, in particular in and counter to the Y direction. The bolt is then pressed into the through-hole. As a result, a resetting/pressing force of the support means acts on the bolt, and the play arising over the service life is compensated for by said resetting/pressing force.

The fitting force required for pressing/fitting the cylindrical region of the bolt into the through-hole is applied to the support means preferably by means of a screw connection. For this purpose, the bolt preferably has a threaded region. The latter has a diameter which is preferably smaller than the height of the through-hole. The bolt can therefore be fitted in the threaded region into the through-hole initially without force.

In order to be able to press/fit the bolt into the through-hole with as uniform a fitting force as possible, the bolt preferably also has a conical region widening in a fitting direction between the cylindrical region and the threaded region. The conical region and the cylindrical region are preferably directly adjacent to each other.

It is preferred for a diameter of the conical region at the transition to the threaded region to be approximately equal to that of the threaded region or only insignificantly larger. As a result, the bolt can be fitted into the through-hole without force until it lies in the conical region against the support means.

A length of the threaded region is preferably of such a size that said threaded region, with the conical region there lying against the through-hole, extends out of the through-hole. As a result, the threaded region is accessible from the outside, and a nut which is provided for introducing the fitting force can be screwed onto the bolt. A length of the conical region plus a length of the cylindrical region is furthermore preferably smaller than the depth of the through-hole.

The diameter of the conical region at the transition to the cylindrical region is particularly preferably approximately equal to that of the cylindrical region. As a result, the bolt slides at the transition of the conical to the cylindrical region into the through-hole.

The arrangement preferably furthermore has a stop as an end position for the support means. In a first preferred embodiment, the stop is arranged on the bolt. In a second preferred embodiment, an end surface on the hinge, in particular on the first hinge arm, forms the stop. An embodiment is also preferred in which the stop is provided on the housing, in particular on a motor vehicle body. The stop limits the displacement of the support means along the bolt in the fitting direction.

The component is preferably a flap. It is particularly preferably a tailgate of a motor vehicle. It is preferred for the component to be arranged on the second hinge arm. In this embodiment, the adjustment drive is therefore a flap drive. However, the adjustment drive is in principle also suitable for adjusting other components, such as, for example, for adjusting the height of a seat.

In order to automatically pivot the component, it is preferred for the drive arrangement to have an adjustment drive with a drive means. The drive means preferably drive a gearing, preferably a reduction gearing for reducing a speed of the drive means.

In order to ensure a sufficient reduction, the gearing is preferably designed as a double worm gearing. However, a different gearing, for example a worm gearing, a spur gearing, a planetary gearing and/or a combination of such gearings, is also preferred.

The adjustment drive preferably comprises an electric motor, preferably a permanently excited electric motor, as the drive means. A direct current motor (DC motor) is particularly preferably used as the electric motor. However, the use of a synchronous motor is also preferred.

The adjustment drive is provided for automatically driving the hinge, in particular the second hinge arm. For this purpose, the gearing arrangement preferably has an output shaft on which a drive lever is arranged, in particular of a form- and/or force-fit, for conjoint rotation. The second hinge arm is preferably secured on the drive lever, for example is screwed thereon. The output shaft preferably extends along an output axis in the fitting direction.

In a preferred embodiment, the hinge axis is arranged in alignment with the output axis of the gearing arrangement. The first hinge arm is very particularly preferably mounted in a bearing hole. The bearing hole is preferably provided centrally in the output shaft. For this purpose, the first hinge arm preferably has a bearing pin which engages in the bearing hole. This arrangement is possible in a highly space-saving manner with few components.

The support means is preferably a housing component of the adjustment drive. However, a body component of a motor vehicle can also be used. It is particularly preferably designed as an insertable panel, and therefore it is of panel-like design. As a result, it can be very simply adapted to the geometry of the hinge, for example by means of an additional bending process. In this embodiment, it can be produced cost-effectively from a flat band material as a punched part. As a result, no additional component is required as the support means. In addition, the drive arrangement of this embodiment forms a modular construction unit. As a result, the adjustment drive can be produced, can be mounted and can be stored with the drive unit and the gearing independently of the hinge, and/or the drive arrangement can be produced, can be mounted and can be stored with the adjustment drive and the hinge independently of the component.

The object is furthermore achieved by a motor vehicle with such a drive arrangement. The drive arrangement is preferably provided for driving the tailgate of the motor vehicle. However, it can also be used for other flaps or components.

The drive arrangement has the advantage that it ensures play-free mounting of the first hinge arm on the bolt in the main loading direction, that is the Y direction, over its service life. Switch-over noises when adjusting the component are thereby avoided.

The object is furthermore achieved by a bolt for such a drive arrangement. The bolt is provided for fastening a first hinge arm to a support means. The bolt extends from a fastening end in the fitting direction to a mounting end. In the fitting direction, it preferably has a threaded region, a conical region widening in the fitting direction, and also a cylindrical region. The cylindrical region preferably directly adjoins the conical region. In the first preferred embodiment, it also has a stop directly adjoining the cylindrical region. In order to secure the bolt against displacement counter to the fitting direction, it furthermore preferably has a bolt head.

The object is furthermore achieved by a method for mounting such a drive arrangement, with the following steps:

pushing the adjustment drive in the fitting direction onto the hinge until the bolt passing through the recess of the first hinge arm lies against the through-hole of the support means, screwing the nut onto the bolt until the support means lies against the stop, and securing the second hinge arm on the drive lever.

It is preferred here for a tightening torque of the nut when being screwed onto the bolt to be of such a magnitude that a tensile force caused by the thread is significantly greater than is required for overcoming the pressing force between the bolt and the support means.

In comparison to conventional mounting processes, the mounting of this drive arrangement is possible without a complicated adjustment operation. All that is required here for fixing the adjustment drive on the hinge is to screw the nut, in particular with one hand, onto the bolt using a tool.

BRIEF DESCRIPTION OF THE DRAWINGS

The invention is described below with reference to figures. The figures are merely by way of example and do not restrict the general inventive concept.

DETAILED DESCRIPTION

Figure 1:
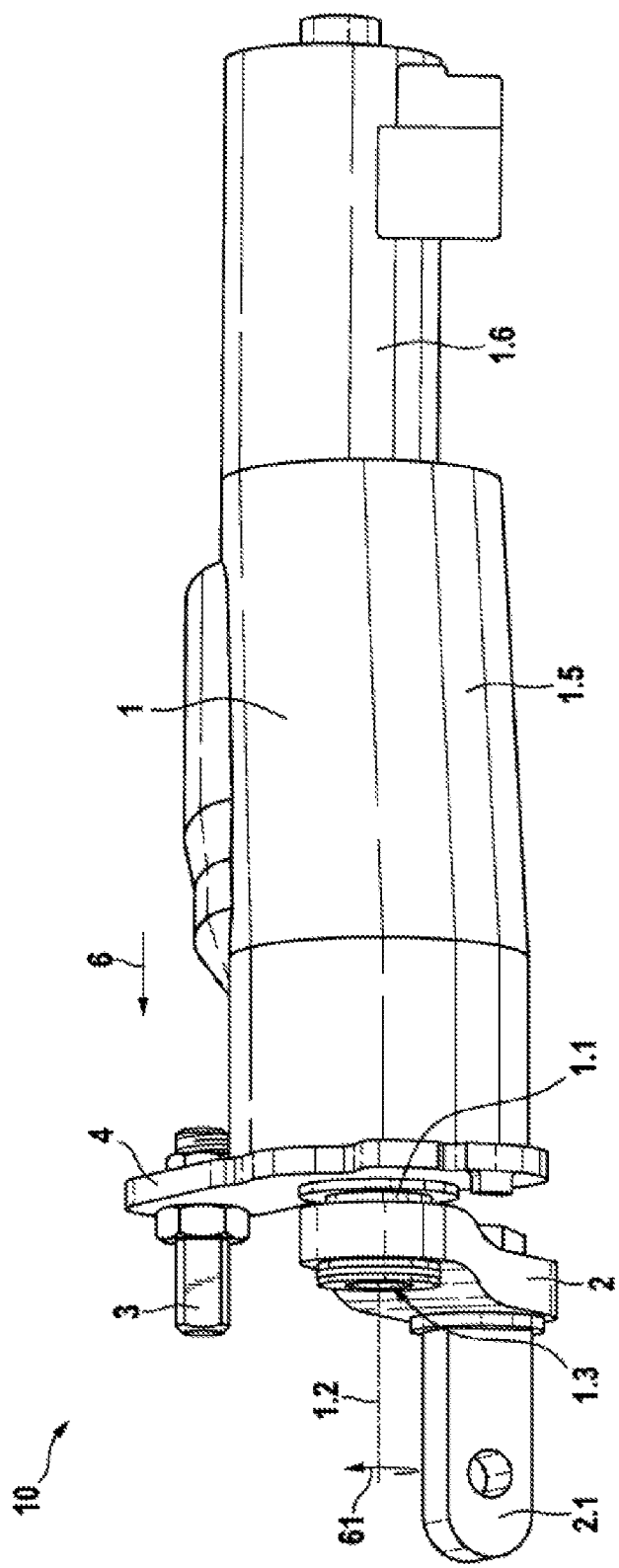
FIG. 1 shows a conventional adjustment drive for a component, in particular of a motor vehicle.

FIG. 1 shows by way of example an adjustment drive for a drive 1 arrangement 10. A hinge 5 (see FIG. 2) of the drive arrangement 10 is not illustrated here.

The adjustment drive 1 is provided for adjusting a component (not shown), for example for pivoting a tailgate. It has an electric motor 1.6 which drives a gearing unit 1.5 which is provided for reducing the speed of the electric motor 1.6. The gearing unit 1.5 has an output shaft 1.1 with a bearing hole 1.3 which extends centrally with respect to an output axis 1.2. The bearing hole 1.3 forms a counter bearing for a first hinge arm 5.1 of the hinge 5, which hinge arm is fixed in relation to a second hinge arm 5.2 of the hinge 5, on which the component can be arranged. The second hinge arm 5.2 can be arranged on a drive lever 2 which is fastened to the output shaft 1.1 for conjoint rotation.

When the output shaft 1.1 is driven about the output axis 1.2, the drive lever 2 and, with the latter, the second hinge arm 5.2 rotate, and therefore the component is pivoted.

In order to support the torque for adjusting the component, a bolt 3 is provided which is arranged on a support means 4. The support means 4 is designed here as a panel-like insertable panel and as a housing component of the adjustment drive 1. In this drive arrangement 10 according to the prior art, the first hinge arm 5.1 can be fastened to the bolt 3.

The terms supports means 3, housing component and insertable panel are used synonymously below. The bolt 3 illustrated here is of cylindrical design and therefore has a constant diameter (not denoted). It permits play-free adjustment, at least in the new state, because of an eccentric design.

Figure 2:
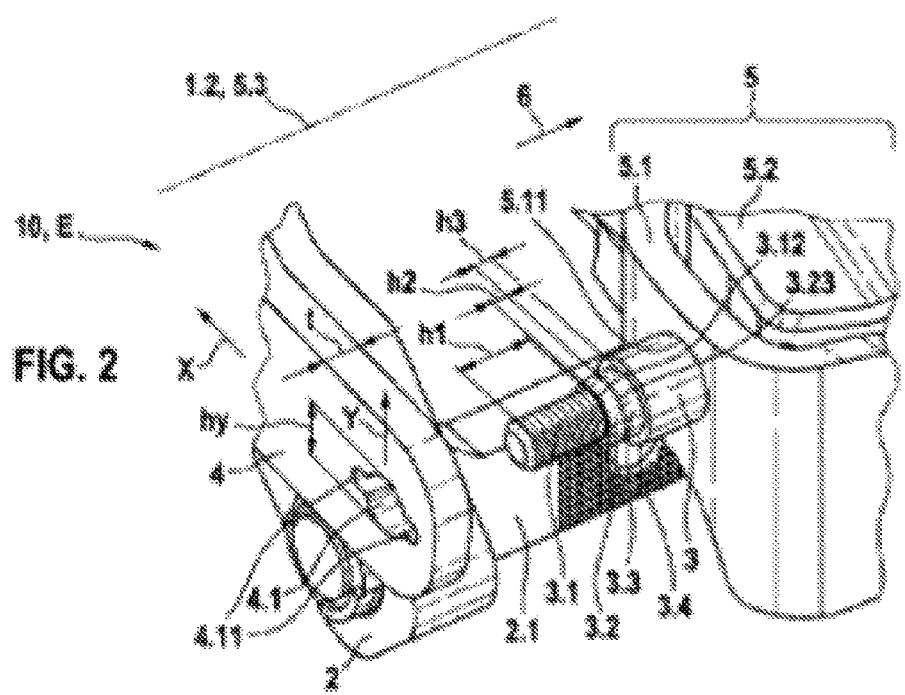
FIG. 2 shows a perspective view of a detail of a drive arrangement according to the invention during the mounting of a hinge.
Figure 3:
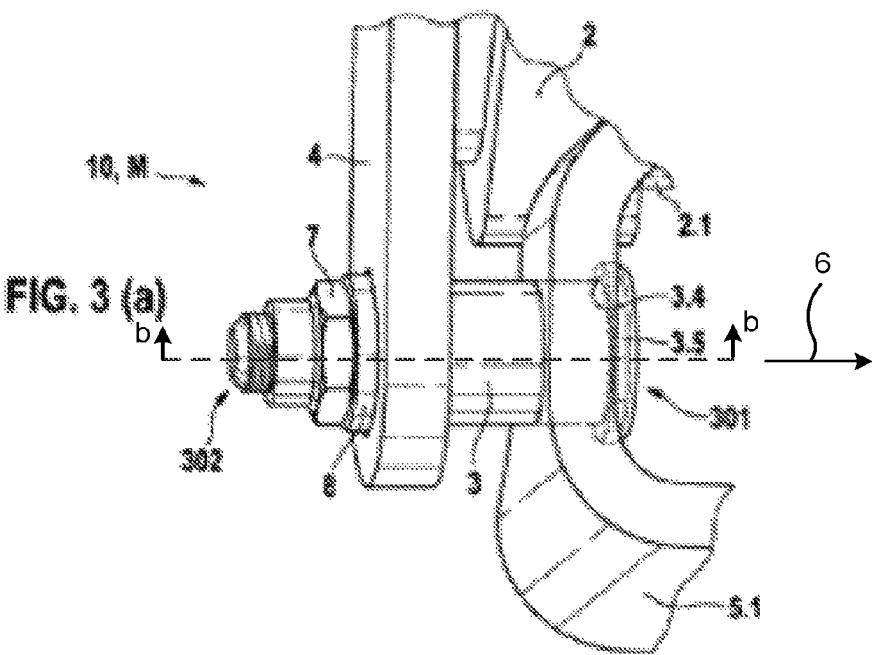
FIG. 3(a) shows a perspective view of a detail from the drive arrangement according to the invention from FIG. 2 after mounting of a first hinge arm of the hinge on a support means of the drive arrangement.
FIG. 3(b) shows a section taken along line b-b in FIG. 3 (a)
Figure 3:
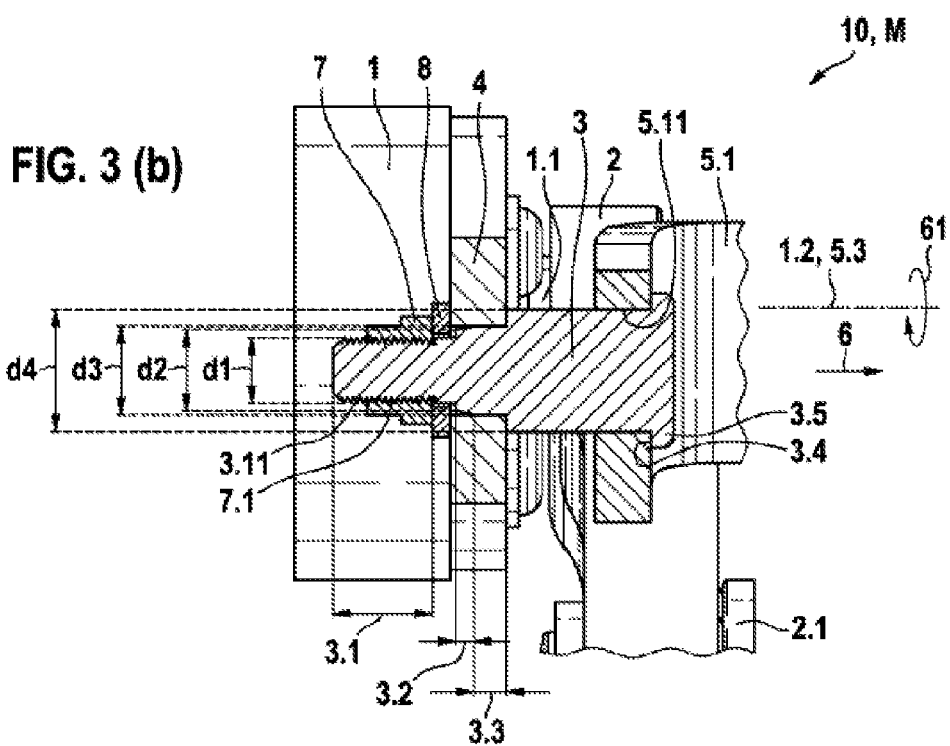

In contrast thereto, the bolt 3 arranged on the first hinge arm 5.1 of the drive arrangement 10 according to the invention of FIGS. 2 and 3 has both a conical region 3.2 and a cylindrical region 3.3.

The drive arrangement 10 according to the invention of FIG. 2 is likewise provided for adjusting the component, here a flap, for example a tailgate. It has the adjustment drive 1 with the electric motor 1.6 as the drive means. The adjustment drive 1 is therefore a flap drive, for example a tailgate drive for a motor vehicle (not shown). The terms adjustment drive 1, flap drive and tailgate drive are used synonymously below. In addition, the terms component, flap and tailgate are used synonymously below.

The electric motor 1.6 drives the gearing 1.5 which is provided for reducing the speed of the electric motor 1.6. The gearing 1.5 is preferably designed as a double worm gearing. It has the output shaft 1.1 which extends concentrically around the output axis 1.2 in a fitting direction 6 (see FIG. 3). The drive lever 2 is arranged on the output shaft 1.1 for conjoint rotation. The drive lever 2 extends in a radial direction (not denoted) to the drive axis 1.2 transversely with respect to the fitting direction. Since the drive lever is arranged on the output shaft 1.1 for conjoint rotation, it rotates when the output shaft 1.1 is driven in or counter to a direction of rotation 61. A fastening pin 2.1 for the fastening of the second hinge arm 5.2 is provided on the drive lever 2.

FIG. 2 shows a detail from the drive arrangement 10 according to the invention in an installed state E. The first and the second hinge arm 5.1, 5.2 of the hinge 5 which is yet to be mounted are visible. The two hinge arms 5.1, 5.2 are rotatable relative to each other about a common hinge axis 5.3. The hinge 5 is mounted here in the bearing hole 1.3 of the output shaft 1.1, and therefore the output axis 1.2 and the hinge axis 5.3 are arranged in alignment with each other. This is demonstrated schematically by the output axis 1.2 and hinge axis 5.3 which are shown in alignment with each other. However, a drive arrangement 10 is also preferred in which the output axis 1.3 and the hinge axis 5.3 are spaced apart from each other.

The installation generally takes place by the adjustment drive 1 being fitted onto the hinge 5. This is shown here by the fitting direction 6.

The second hinge arm 5.2 is secured with a form- and/or force-fit in a mounted state M (see FIG. 3) on the fastening pin 2.1 of the drive lever 2. In addition, in the mounted state M, the flap is fastened to the second hinge arm 5.2. The form- and/or force-fitting fastening of the second hinge arm 5.2 to the driver lever 2 then forms the interface with the component. During the driving of the electric motor 1.6, the second hinge arm 5.2 is rotated with the drive lever 2 about the hinge axis 5.3 in or counter to the direction of rotation 61. In the process, the flap is pivoted with the second hinge arm 5.2 in or counter to the direction of rotation 61. As a result, the flap is opened or closed. The angle (not illustrated) about which the output shaft 1.1 is rotated here corresponds approximately to an opening angle (not illustrated) of the flap.

In order to support a torque which occurs during the adjustment of the tailgate, the support means 4 and the bolt 3 are provided. The bolt is arranged on the support means 4 without play after the drive arrangement 10 is mounted. The support means 4 is also designed here as an insertable panel extending in a panel-like manner.

For this purpose, the first hinge arm 5.1 has a recess 5.11 which is provided for receiving the bolt 3. The recess 5.11 is spaced apart from the hinge axis 5.3.

In addition, the support means 4 has a through-hole 4.1 which is provided for receiving the bolt 3. The bolt 3 is pushed through the recess 5.11 counter to the fitting direction 6. When the support means 4 is displaced in the fitting direction 6, it also enters the through-hole 4.1. In order to limit the displacement of the bolt 3 counter to the fitting direction 6, the bolt has a bolt head 3.5 on a mounting end 301 (see FIG. 3(*a*)) as an end position of the bolt 3 on the first hinge arm 5.1. In principle, a hinge having a bolt 3 arranged integrally on a first hinge arm 5.1 can also be used.

The through-hole 4.1 in the support means 4 is designed as an elongated hole. It extends in a direction of extent X transverse to the fitting direction 6. As a result, it has an elasticity in a Y direction Y which extends transversely with respect to the direction of extent X, and in particular likewise transversely with respect to the fitting direction 6.

A threaded region 3.1 adjoins a fastening end 302 of the bolt 3, which fastening end lies opposite the mounting end 301. In addition, the bolt 3 has a conical region 3.2 widening in the fitting direction 6, and also a cylindrical region 3.3. The cylindrical region 3.3 directly adjoins the conical region 3.2. In the embodiment shown here, the bolt 3 also has a stop 3.4 which directly adjoins the cylindrical region 3.3. In addition, in the case of the embodiment shown here, the conical region 3.2 directly adjoins the threaded region 3.1.

The cylindrical region 3.3 of the bolt 3 has a constant diameter d3 which is greater than a height hy of the through-hole 4.1, in particular in the Y direction Y. In the threaded region 3.1, the outside diameter d1 of the thread 3.11 is smaller than the height hy of the through-hole 4.1. In the conical region 3.2, the diameter d2 of the bolt 3 increases in the fitting direction 6 until it reaches the diameter d3 of the cylindrical region 3.3 at the transition 3.23 to the cylindrical region 3.3. At the transition 3.12 of the threaded region 3.1 to the conical region 3.2, the conical region 3.2 of the bolt 3 has a diameter d2 which corresponds approximately to that of the threaded region 3.1 or is only insignificantly greater.

As a result, the support means 4 can be pushed onto the bolt 3 initially without force, and therefore said bolt reaches through the through-hole 4.1 until the bolt 3 lies in the conical region 3.3 against the support means 4.

A length h1 of the threaded region 3.1 is of such a size here that the bolt 3 extends out of the through-hole 4.1 when the conical region 3.2 lies against the through-hole 4.1. As a result, the threaded region 3.1 is accessible from the outside. A nut 7 which is provided for introducing the fitting force can thereby be screwed onto the bolt 3. During the screwing-on operation, the support means 4 is displaced in the fitting direction 6 along the bolt 3.

Since the diameter d3 of the cylindrical region 3.3 is larger than the height hy of the through-hole 4.1, the through-hole 4.1 is expanded when the nut 7 is screwed on. As a result, the bolt 3 is pressed into the through-hole 4.1. As a result, when the nut 7 is mounted, the support means 4 acts on the bolt 3 with a resetting force by means of which the play arising over the service life is compensated for.

So that the bolt 3 is also mounted on the support means 4 without play in the fitting direction 6, firstly a length h2 of the conical region 3.2 plus a length h3 of the cylindrical region 3.3 is smaller than a depth t of the through-hole 4.1. Secondly, the drive arrangement 10 has a stop 3.4 which serves as end position for the support means 4 and is arranged here on the bolt 3. However, the stop can also be formed by the first hinge arm 5.1 or by a housing component (not shown). The stop 3.4 limits the displacement of the support means 4 along the bolt 3 in the fitting direction 6.

FIG. 3 shows the bolt 3 fitted on the support means 4. In this embodiment, a washer 8 is arranged between the support means 4 and the nut 7.

The screw connection between the thread 7.1 of the nut 7 and the thread 3.11 of the threaded region 3.1 of the bolt 3 is emphasized in FIG. 3(*b*). A region (not denoted) without a thread 3.11 is provided here between the threaded region 3.1 and the conical region 3.2 and is bridged by the washer 8.

For the mounting of the drive arrangement 10, the bolt 3 is fitted into the recess 5.11 of the first hinge arm 5.1 counter to the fitting direction 6. Subsequently, the adjustment drive 1 is pushed in the fitting direction 6 onto the hinge 5, in particular onto the first hinge arm 5.1, until the bolt 3 lies against the through-hole 4.1 of the support means 4. The bolt 3 is dimensioned in such a manner that it then lies in the conical region 3.2 against the support means 4, in particular against the through-hole 4.1.

The nut 7 is then screwed onto the bolt 3 until the support means 4 lies against the stop 3.4. The tightening torque of the nut 7 during the screwing onto the bolt 3 is of a size sufficient such that the tensile force of the thread 7.1, 3.11 is great enough in order to overcome the pressing force between the bolt 3, in particular the cylindrical region 3.3, and the support means 4. Since the diameter d3 of the cylindrical region 3.3 is larger than the height by of the through-hole 4.1, the latter is extended in the process, in particular in the Y direction Y. As a result, the bolt 3 is fixed with an elastic press fit in the through-hole 4.1.

The second hinge arm 5.2 is then secured on the drive lever 2, in particular on the fastening pin 2.1.

In comparison to conventional mounting processes, for fixing of the first hinge arm 5.1 all that is required here is for the nut 7 to be screwed on with a sufficiently large tightening torque. The mounting is therefore possible very simply and without complicated adjustment operations, in particular single-handed, using a tool.

Figure 4:
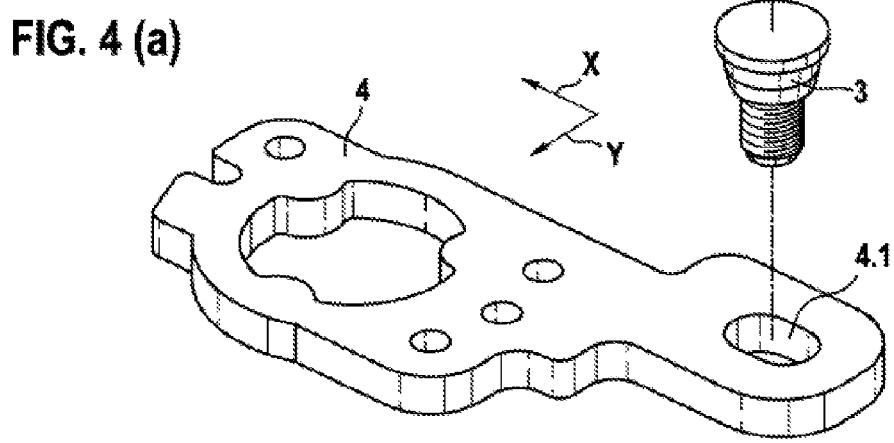
FIG. 4(a) shows a support means for the drive arrangement.
FIGS. 4(b), 4(c) and 4(d) show various embodiments of a through-hole.
Figure 4:
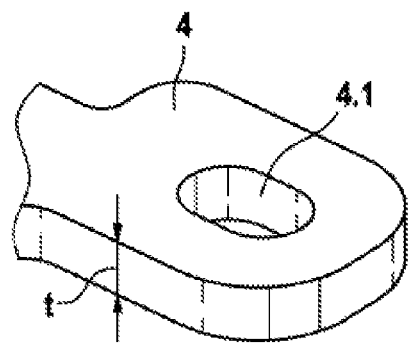
Figure 4:
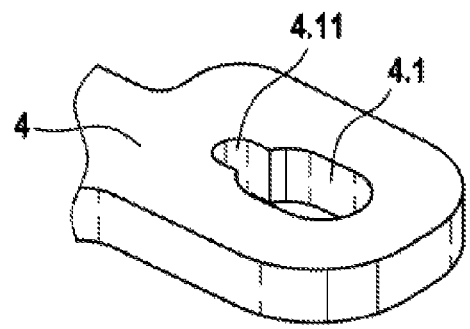
Figure 4:
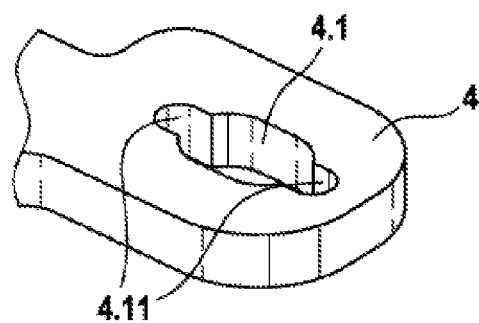

FIG. 4(*a*) shows the support means 4, wherein the fitting of the support means 4 onto the bolt 3 is illustrated schematically in the fitting direction 6. FIGS. 4(*b*)-(*d*) each show a detail of the support means 4 with various embodiments of the through-hole 4.1.

The through-hole 4.1 of FIG. 4(*b*) is designed as an elongated hole which extends in the direction of extent X. In order to adapt the elasticity of the through-hole 4.1 in the Y direction Y in a manner specific to use, the through-hole 4.1 of FIG. 4(*c*) has a notch 4.11 in the direction of extent X. In comparison to the through-hole 4.1 of FIG. 4(*b*), the elasticity of the through-hole 4.1 of FIG. 4(*c*) is as a result greater in the Y direction Y.

Even greater elasticity of the through-hole 4.1 can be achieved by the through-hole 4.1 having two notches 4.11 which extend in and counter to the direction of extent X of the through-hole 4.1 and which are therefore arranged on opposite sides of the through-hole 4.1. This is shown in FIG. 4(*d*).

The elasticity of the press fit between the cylindrical region 3.3 of the bolt 3 and the support means 4 can be adapted by selection of the elasticity of the through-hole 4.1.

It has been shown by a simulation that a plastic deformation of the through-hole of approximately 40% is accompanied by an elastic deformation of approximately 60%, by means of which the freedom from play of the connection of the bolt 3 with the support means 4 is ensured, despite possible settling processes, over the service life of the drive arrangement 10.

The invention claimed is:

1. A drive arrangement (10) for a rotatable flap, with a hinge which has a first hinge arm (5.1) and a second hinge arm (5.2) rotatable with respect to the first hinge arm (5.1) about a hinge axis (5.3), wherein the drive arrangement (10) comprises a support means (4) on which a bolt (3) which reaches through a recess (5.1.1) in the first hinge arm (5.1) is arranged, characterized in that the bolt (3) is secured by an elastic press fit in a through-hole (4.1) of the support means (4).

2. The drive arrangement (10) as claimed in claim 1, characterized in that the through-hole (4.1) has a direction of extent (X), wherein said through-hole is elastic in a Y direction (Y) transverse to the direction of extent (X).

3. The drive arrangement (10) as claimed in claim 1, characterized in that the through-hole (4.1) is an elongated hole.

4. The drive arrangement (10) as claimed in claim 1, characterized in that a notch (4.11) is provided on the through-hole (4.1).

5. The drive arrangement (10) as claimed in claim 1, characterized in that the support means (3) is an insertable panel.

6. The drive arrangement (10) as claimed in claim 1, characterized in that the bolt has a cylindrical region (3.3) which has a diameter (d) which is larger than a height (hy) of the through-hole (4.1).

7. The drive arrangement (10) as claimed in claim 6, characterized in that the bolt (3) has a threaded region (3.1) with a thread (3.11), wherein an outside diameter (d1) of the bolt (3) in the threaded region (3.1) is smaller than the height (hy) of the through-hole (4.1).

8. The drive arrangement (10) as claimed in claim 7, characterized in that a conical region (3.2) widening in a fitting direction (6) is provided between the threaded region (3.1) and the cylindrical region (3.3).

9. The drive arrangement (10) as claimed in claim 8, characterized in that a diameter (d2) of the conical region (3.2) at a transition (3.23) to the cylindrical region (3.3) is approximately equal to that of the cylindrical region (d3).

10. The drive arrangement (10) as claimed in claim 7, characterized in that a length (h1) of the threaded region (3.1) is greater than the depth (t) of the support means (4).

11. The drive arrangement (10) as claimed in claim 1, further comprising a stop (3.4) for the support means (4).

12. The drive arrangement (10) as claimed in claim 1, further comprising an adjustment drive (1) for automatic rotation of the second hinge arm (5.2), wherein the second hinge arm (5.2) is arranged on a drive lever (2) which is arranged on an output shaft (1.1) of the adjustment drive (1) for conjoint rotation.

13. A motor vehicle with a rotatable flap, having a drive arrangement (10) as claimed in claim 1.

14. A method for mounting a drive arrangement (10) as claimed in claim 12, with the following steps:
   pushing the adjustment drive (1) in a fitting direction (6) onto the hinge until the bolt (3) passing through the recess (5.11) of the first hinge arm (5.1) lies against the through-hole (4.1) of the support means (4),
   screwing a nut (7) onto the bolt (3) until the support means (4) lies against a stop (3.4), and
   securing the second hinge arm (5.2) on the drive lever (2).

* * * * *